Oct. 15, 1940.  S. WABEKE  2,218,272
AUTOMATIC LATERAL STABILIZER FOR AIRPLANES
Filed April 19, 1938  2 Sheets-Sheet 1
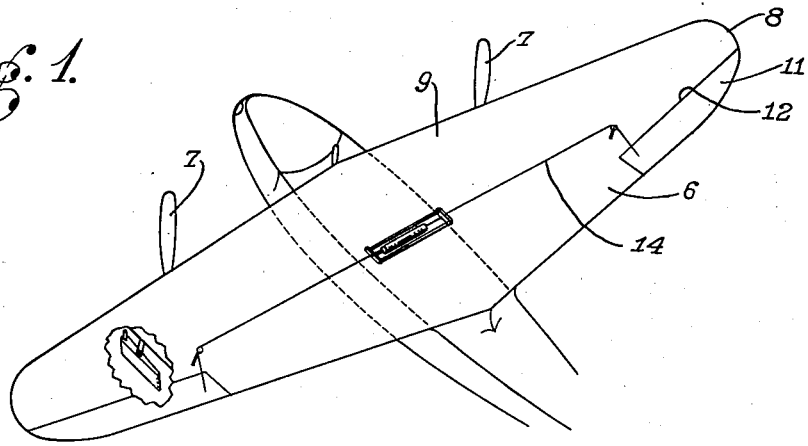
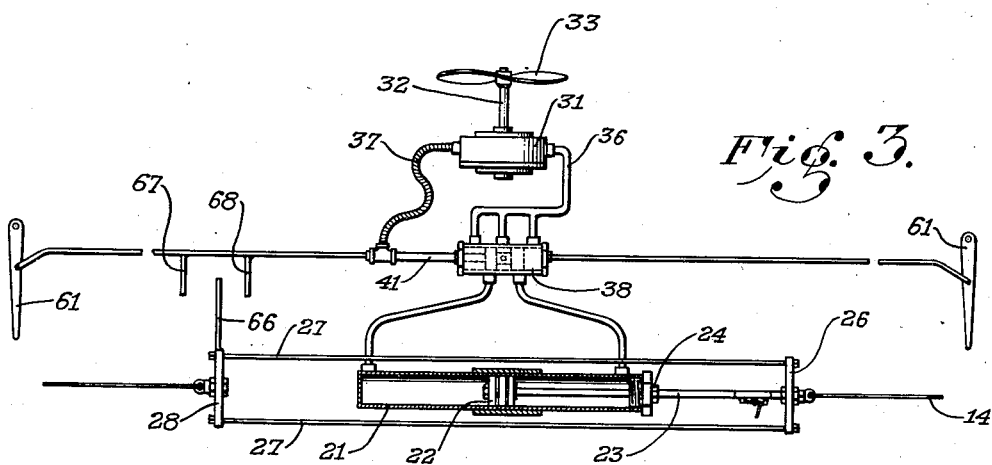
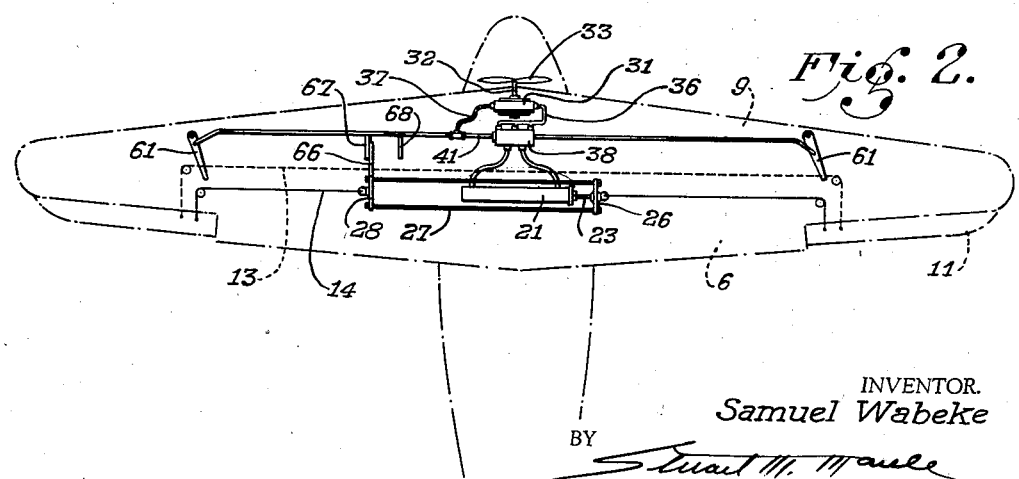
INVENTOR.
Samuel Wabeke
BY
ATTORNEY.

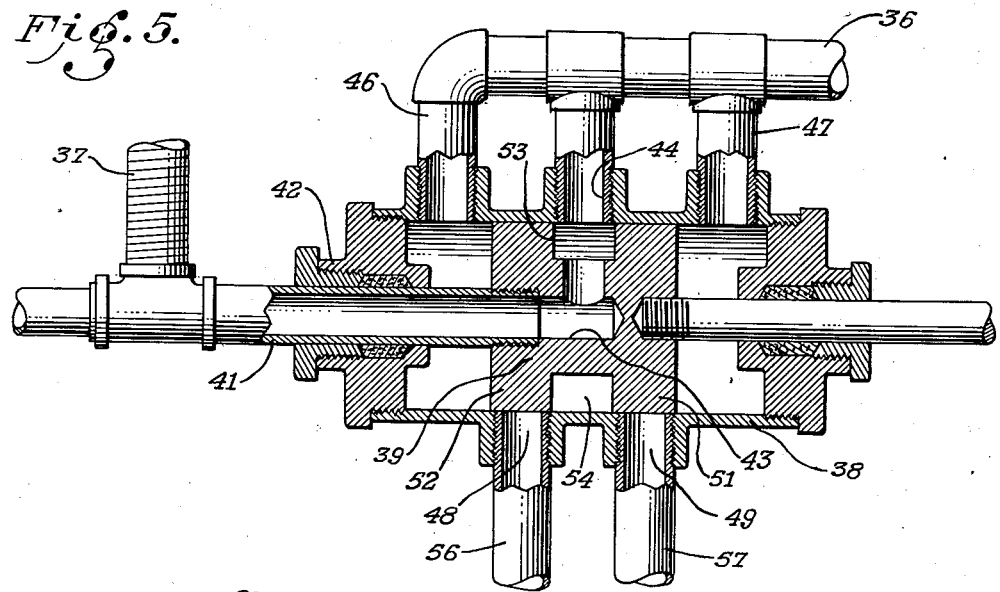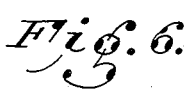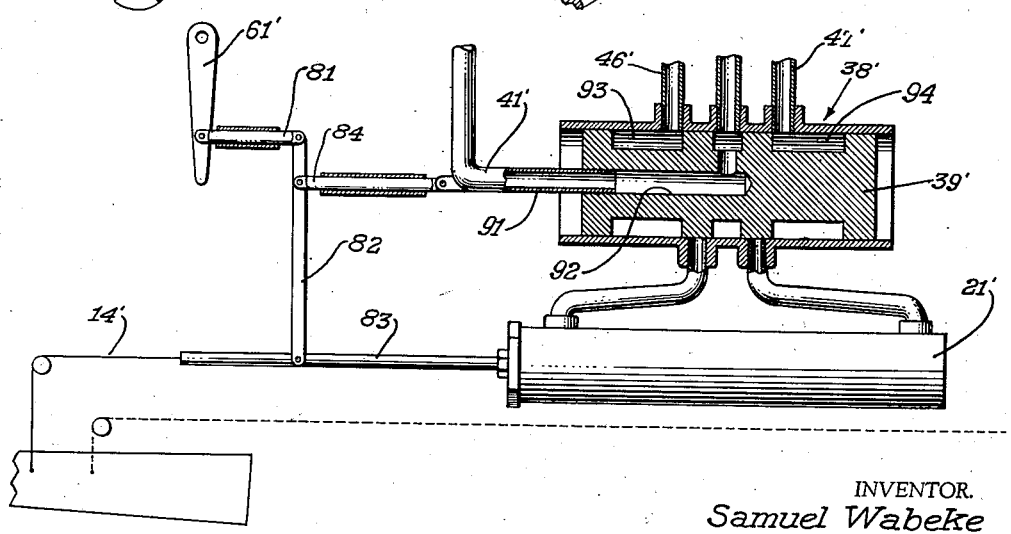

Patented Oct. 15, 1940

2,218,272

UNITED STATES PATENT OFFICE 2,218,272

AUTOMATIC LATERAL STABILIZER FOR AIRPLANES

Samuel Wabeke, Los Angeles, Calif.

Application April 19, 1938, Serial No. 202,883

2 Claims. (Cl. 244—82)

This invention relates to airplanes and more particularly to apparatus functioning automatically to control the movements of an airplane during flight.

An object of the present invention is to provide an automatically operating apparatus for maintaining the lateral stability of an airplane, which apparatus is sensitive to and is operated as the result of movements of air in directions other than parallel to the longitudinal axis of the airplane.

A more detailed object of the present invention is to provide controls for the ailerons of an airplane, the movements of which are regulated through the expedient of a vertically disposed airfoil, which is sensitive to movement of air transversely with respect to the airplane.

A further object is to provide apparatus for operating the ailerons of an airplane, as described herein. The vertically disposed airfoil is connected merely to a valve, the movement of which requires relatively little force, thus making the apparatus extremely sensitive to even relatively slight transverse air movements. The valve, however, controls the operation of power driven apparatus, so that even though a relatively small amount of force is exerted against the airfoil, ample power is provided to induce and control the necessary manipulation of the ailerons.

Another object of the present invention is to provide, in an aileron operating apparatus as described, a prime mover which operates with ample power, so long as the airplane is in motion through the air, being entirely independent of the driving engine or engines of the airplane so that it continues to operate efficiently and dependably, even when the engine or engines are stopped and the ship is merely gliding.

A further object is to provide an aileron controlling apparatus of the general character indicated, which is of very simple construction, being composed of a minimum number of simple and relatively small light parts, thus contributing to the lightness of the apparatus, and yet which is highly efficient in its operation, and moreover is fully dependable and thus contributes in no small measure to removing one of the major hazards of flight.

The invention possesses other objects and features of advantage, some of which, with those enumerated, will be set forth in the following description of the particular embodiment of my invention which is illustrated in the drawings accompanying and forming a portion of the specification. It is to be understood that I do not limit myself to the showing made by the said drawings and description, as I may adopt variations of the preferred form within the scope of my invention as set forth in the claims.

Referring to the drawings:

Figure 1 is a perspective view looking down upon the top of an airplane provided with automatic aileron controlling apparatus, incorporating the principles of the present invention. A portion of the figure is broken away to reduce its size.

Figure 2 is a diagrammatic view showing the relative arrangement of the parts of my apparatus with respect to the airplane, the latter being illustrated in broken lines. This may be considered a top plan view, although most of the parts of the apparatus would be concealed from view in looking down upon the top of the ship.

Figure 3 is an enlarged top plan view of the apparatus of the present invention.

Figure 4 is an enlarged detail view in perspective, and partially broken away, showing the means for connecting the ailerons optionally to either the automatic control or the conventional manual control.

Figure 5 is a more highly enlarged view in longitudinal section of the valve cylinder whereby operation of the apparatus is controlled.

Figure 6 is a view similar to Figure 3, but showing a slightly modified form of apparatus.

In terms of broad inclusion, the present invention contemplates the provision of power driven means for varying the angles of the ailerons, with respect to the horizontal flight of the airplane of which they are a part. In accordance with conventional practice, the ailerons are mounted for movement about horizontal axes, i. e., axes extending transversally with respect to the longitudinal dimension of the airplane, and are coupled for differential movement, so that the reactive force resulting from the impingement of air against the aileron on one side of the ship causes that side to move upwards; whereas that of the other aileron causes its side of the ship to move downwards, the purpose being, of course, to maintain lateral stability of the ship during flight and to cause the ship to bank, as is necessary when changing its course, and to control the amount of such banking. Conventionally the ailerons are controlled manually, but the present invention's purpose is to provide power-driven means for operating the controls, which power means is automatically regulable through the expedient of an airfoil, so mounted on the airplane that it is moved by currents of air moving transversally with respect to the ship. Hence, for example, when the pilot desires to change his course, it is necessary merely for him to shift the vertical rudder. If the turn is to be made to the right, for example, the appropriate movement of the rudder will cause the ship's nose to head in the new direction, but if the ship were to remain in its same attitude, with respect to the earth, it would continue in a straight course moving laterally, however, because of the fact that the ship has turned. Hence, in order to cause the ship to move in the desired direction, it is necessary to cause it to bank, i. e., to lift the left wing and to lower the right; whereupon the air impinging against the wings will cause the ship to travel in the new direction by causing this banking operation to be performed automatically. Much less skill is required in the successful handling of the ship, and consequently one of the principle hazards of flying is materially lessened. Furthermore, the apparatus of the present invention is of great utility in instruction, wherein the "feel" of a ship can be made familiar to a novice much more expeditiously and safely than where such automatic controls are not provided.

One embodiment of the apparatus forming the subject matter of the present invention is illustrated more or less diagrammatically in the figures. An airplane 6, here illustrated as of the monoplane type, is adapted to be driven forward by a pair of motors (not shown) each equipped with a conventionally driving propeller 7 adjacent to the tips 8 of the wing 9. Ailerons 11, preferably of conventional design, are provided, each aileron being pivoted along its forward edge 12, for swinging movement either upwards or downwards from the plane of the remainder of the wing. For this purpose, suitable cables 13 and 14 interconnect the ailerons on their under and upper sides respectively, being guided to the ailerons by suitable sheaves or pulleys (not shown), so arranged that when the upper cable 14 (Figure 1) is moved to the right, the aileron 11 on the left hand wing tip will swing upwards while the other swings downwards. Such movement of the cable 14 is, of course, accompanied by corresponding movement of the under-cable 13 in the opposite direction.

In the conventional airplane, such shifting of the cables is either produced manually or by any power means controlled manually. In the apparatus of the present invention, a cylinder 21 is so mounted upon the airplane that its longitudinal axis substantially coincides with one of the cables, preferably the lower cable 13. A plunger 22 is reciprocably mounted within the cylinder 21 and its rod 23 extends through a suitable stuffing box 24 to a cross-head 26 connected by a plurality of rods 27 to another cross-head 28 upon the opposite end of the cylinder 21. These two opposed and rigidly connected cross-heads 26 and 28 are interposed in the lower cable 13 with the result that any movement of the plunger 22 within the cylinder 21 produces simultaneous and coextensive movement of the lower cable 13, with the resulting shifting of the two ailerons.

The fluid for operating the plunger 22 derives the necessary energy from a suitable pump 31, the shaft 32 of which carries a propeller 33 exposed to the air through which the airplane 6 is moving during flight. Hence, the pump 31 is suitably energized without reference to the driving motors, so that even when the motors are stopped and the ship is merely gliding, still the pump 31 will remain in operation.

The inlet and outlet conduits 36 and 37 of the pump 31 lead to a valve housing 38, within which a tightly fitting plunger 39 is reciprocable. A rod 41 for this plunger is of tubular form and extends through a suitable stuffing box 42 at one end of the cylinder 38, where a suitable fitting permits the flexible outlet conduit 37 from the pump 31 to be connected thereto, so that fluid forced from the pump 31 flows into the tubular rod 41. Intermediate the ends of the plunger 39 a portion 53 of reduced diameter is provided, with which the bore of the tube 41 communicates at all times. When the plunger 39 is in its intermediate or neutral position, the portion 53 of reduced diameter communicates with a port 44 in a side wall of the cylinder 38, to which the inlet conduit 36 of the pump 31 is connected. Auxiliary conduits 46 and 47 lead from the opposite ends of the cylinder 38 to the conduit 36 to establish communication therebetween. Another pair of spaced ports 48 and 49 are provided in the wall of the cylinder 38 in such position that they are crossed by the portions 51 and 52 of the plunger 39, which are of full diameter. Hence, when the plunger 39 moved to the right its annular space 53, which communicates at all times with the bore of the tube 41 as by a radial passage 54, moves into registry with the port 49, and the other port 48 is uncovered to permit its communication with the associated end of the cylinder 38 and through it with the conduits 46 and 36. On the other hand, when the plunger 39 moves to the left, the annular space 53 communicates with the port 48, whereas the port 49 is brought into communication with the conduits 47 and 36. The ports 48 and 49 are connected by conduits 56 and 57 respectively, which communicate with the corresponding ends of the working cylinder 21. Hence, when the rod 41 of the plunger 39 moves to the right, fluid under pressure from the pump 31 flows through the port 49 and conduit 57 to the right hand end of the cylinder 21, causing the plunger 22 to move to the left, i. e., in the opposite direction to that in which the rod 41 has moved. As the plunger 22 moves in this direction, fluid in the other end of the cylinder 21 is forced through the conduit 56 into the valve cylinder 38 through the port 48, which has been uncovered by the movement of the valve plunger 39, so that this fluid returning from the working cylinder 21 can flow on through the valve cylinder 38 to the conduits 46 and 36 and thence back to the pump 31.

Thus it may be seen that the arrangement of the parts described is such that the cable 13, which interconnects the upper sides of the two ailerons, is caused to move in the opposite direction as the rod 41 moves. This rod 41 is connected to one or more suitable airfoils mounted in convenient position where they are exposed to the air through which the ship is moving. Moreover, these airfoils are mounted for movement upon vertical axes which are at their leading edges, with the result that if there is any movement of air transversely of the ship, these airfoils are caused to move correspondingly, carrying with them the rod 41 to which they are pivotally connected.

Consider now that the ship is in normal flight, and moving straight ahead. In making a turn, it is necessary to bank the ship, so as to raise that wing tip, which is to be on the outside of the turn, and in order to do this, it is necessary to lower the aileron on that wing tip causing that wing tip to rise. The other aileron, of course, is raised, causing its associated wing tip to be lowered. In making the turn, the operator merely shifts the vertical rudder so as to cause the ship to head into the desired direction. This will cause the ship to move more or less obliquely through the air, producing a cross current of air (remembering that the ship has not yet banked), wherein the air moves from the wing tip, which is to be on the outside of the curve, rearwards of the ship and toward the opposite side of the ship. The impingement of air against the airfoils 61 causes the airfoils to assume positions parallel to the direction of airflow, i. e., pointing rearwards of the ship and obliquely toward the side of the ship which is on the inside of the curve. This causes the rod 41 to move away from the wing tip, which is to be on the outside of the curve, which as explained hereinabove causes the upper aileron cable 14 to move in the opposite direction, i. e., toward the wing tip on the outside of the curve. This cable 13 being connected to the upper side of the ailerons causes the aileron on the outside of the curve to be lowered, and the other one to be raised, causing the ship to bank in that direction; wherein the wing tip on the outside of the curve is raised and the other wing tip is lowered in compliance with the requirements for turning in the desired direction.

Of course, when the ship has veered into the desired direction the operator will return his rudder to neutral position, whereupon oblique movement of the air, with respect to the ship in the opposite direction from that heretofore described, will swing the airfoils 61 in that direction, which will cause the ailerons to be reversed returning the ship to horizontal position for normal flight.

Inasmuch as the working plunger 22 will continue to move until the valve plunger 39 has been returned to neutral position, I find it desirable to provide a safety stop in the form of a finger 66 rigid with one of the cross-heads, say the cross-head 28, and disposed between spaced fingers or lugs 67 and 68, carried by the rod 41. These parts are so arranged that when the plunger 22 has moved far enough to bring the ailerons to almost either their extreme positions, the finger 66 will engage either finger 67 or 68 depending upon the direction of movement. Since movement of the control rod 41 results in movement of the cross-head 28 in the opposite direction, this engagement between the finger 66 and either of the lugs 67 or 68 will return the valve plunger 39 to neutral position; thus preventing any further flow of fluid to the working cylinder, and will hold the ailerons in their then position until the valve plunger is moved by the airfoils 61 in the opposite direction, to return the ailerons to neutral position.

The automatic control mechanism of my invention facilitates the problems of flight under substantially all flying conditions. Even when stunting, the automatic lateral stabilizer of my invention functions smoothly, efficiently, and dependably. However, to make it possible to disconnect the automatic control and permit manipulation of the ailerons by conventional manually operated means, I find it desirable to provide, preferably in the portion of the plunger rod 23 which is between the stuffing box 24 and the proximal cross-head 26, means for effecting such variation of control. This can conveniently take the form of two rods disposed along side of and in sliding contact with the rod 23. Instead of being directly connected to the cross-head 26, the rod 23 can optionally be connected to it or disconnected therefrom. The center rod 71 is the one which connects to the cross-head 26 and the rod 72 which is on the opposite side of the rod 71 of the plunger rod 23 is connected by the usual cable to the manual control, which is accessible to the pilot. Sliding keys 73 and 74 are adapted to engage the rod 71 optionally to either the plunger rod 23 or the manually shifted rod 72. However, these keys 73 and 74 are connected by a rocker arm 76 pivoted in a suitable transverse bearing 77, whereby either of the keys 73 or 74 can be moved into engaging position. By moving the key 74 into engaging position, the intermediate rod 71, which is connected to the ailerons, is connected to the plunger rod 23 for automatic operation of the ailerons. Any suitable means can be employed for holding the keys 73 and 74 in alignment with the key-ways when they are completely removed therefrom, such as by fastening the keys 73 and 74 rigidly to the rocker arm 72. It is desirable so to arrange the parts that neither key can be completely removed from its engaging position until after the other key has been moved far enough to insure that its associated rods are interconnected. This assures that the ailerons will never be disconnected from both controls simultaneously and it makes it possible for the manually operated control lever, or "joy stick" to be caused to move in accordance with whatever movement of the ailerons is affected by the automatic control. This last mentioned feature is advantageous in giving instruction to a student of flying, for the reason that it aids in giving the student a comprehensive understanding of the "feel" of the ship, and of the effects produced thereon by the different movements of the control lever. Or, stated in another way, he is enabled to learn quickly and with a minimum of danger what movements of the control lever are necessary to produce certain effects upon the manner of the ship's flight.

A slightly modified form of construction is illustrated in Figure 6. Here the airfoil 61', instead of being connected directly to the plunger 39' of the valve, is connected by a rod 81 to one end of a freely floating, compensating lever 82. The other end of the lever 82 is pivoted to a nonflexible portion 83 of the aileron-operated cable 14', it being important that the cable to which the lever 82 is connected is the one which is caused to move in the direction opposite to that in which the rod 81 moves, in order to effect movement of the cable. The rod 41', which is tubular and serves as the inlet conduit for the control valve 38', is connected by a link 84 to the lever 82, being pivoted thereto between the rods 81 and 83, but preferably closer to the airfoil rod 81 than the aileron wire 14'.

The effect of this arrangement is the tendency to return the valve to neutral position without waiting for the ship to swing beyond that attitude for the attainment of which the preceding movement of the airfoil 61' and valve plunger 39' has been made. Consider, for example, that a cross current of air has caused the airfoil to swing to the left as viewed on Figure 6. This will cause the lever 82 to swing around its pivotal connection to the rod 83, carrying this valve plunger 39' to the left, but through a slightly shorter distance than that through which the airfoil rod 81 moves. Such movement of this valve plunger 39' will permit flow of fluid to the left-hand end of the working cylinder 21' causing the working plunger to move to the right, effecting adjustment of the aileron in that direction, which will correct the attitude of the ship and thus overcome the cross-current which has produced the described movement of the airfoil 61'. As the movement of the ailerons occurs, however, the lever 82 is swung about its pivotal connection to the airfoil rod 81, and in the direction opposite that in which it has swung previously due to the movement of the airfoil. Accordingly, the valve plunger 39' is returned at least part way to its starting position before the airfoil 61' is returned to its neutral position. Obviously, therefore, much less correction of the airfoil 61' is necessary to move the valve plunger 39' far enough in the direction opposite to that in which it was previously moved by the airfoil, in order to return the ailerons to their neutral position.

The exact positioning of the rods 81, 83, and 84 with respect to each other throughout the length of the lever 82, is, of course, a matter of adjustment, and will depend, in some measure, at least, upon the individual characteristics of each ship upon which the apparatus is installed.

In Figure 6, the valve plunger 39' also is of modified form. It is provided with an extended core 91 at each end, with an enlarged portion 92 at the outer end of each extended core 91, fitting the cylinder 38' so as to prevent escape of fluid to the ends of the plunger 39, and still permitting return flow from the working cylinder 21' to the conduits 46' and 47' by way of the annular recesses 93 and 94, respectively, in the same manner as in the case of the previously described modification. By keeping pressure off the ends of the cylinder, I am able to avoid the tendency for the pressure exerted by the working fluid to move the valve plunger 39'—hence, this form of plunger last described makes for more exact, dependable, and positive operation of my aileron-operating apparatus.

I claim:

1. In an airplane having a wing and an aileron pivotally mounted thereon for movement about a horizontal axis, an airfoil pivotally mounted for movement about a vertical axis and sensitive to movement of air transversely of said airplane, a hydraulic pump, actuating means therefor, a hydraulic cylinder, a plunger reciprocably mounted therein, conduits connecting opposite ends of said cylinder to said pump, valve means for controlling flow from said pump and for determining to which end of said cylinder fluid shall be supplied, a rod connected to said airfoil to be reciprocated thereby, a rod operably connected to said plunger to be reciprocated thereby, the movement of said last mentioned rod being substantially parallel to that of said airfoil rod and in the opposite direction, a compensating lever connected at each end to one of said rods, means connecting said valve to a point intermediate the ends of said lever, and means connecting said aileron to said plunger to be operated thereby.

2. In an airplane, a wing, an aileron mounted thereon and movable to control flight of said airplane, an airfoil mounted on said airplane, said airfoil being sensitive to and movable by air moving transversely with respect to said airplane, means for operating said aileron comprising an actuator and means connecting said actuating means to said aileron, means for controlling operation of said actuator, and means connecting said control means to said airfoil to be operated thereby comprising means movable parallel and opposite to said conecting means of said actuator, a compensating lever pivoted at one end to said connecting means of said actuator and intermediate its ends to said movable connecting means of said actuator-controlling means, and means connecting the other end of said lever to said airfoil.

SAMUEL WABEKE.